United States Patent [19]

Chaplin

[11] Patent Number: 4,577,508
[45] Date of Patent: Mar. 25, 1986

[54] OPTICAL VIBRATION ANALYZER

[75] Inventor: Russell Chaplin, Dibden Purlieu, United Kingdom

[73] Assignee: International Business Machines Corporation, Armonk, N.Y.

[21] Appl. No.: 664,139

[22] Filed: Oct. 24, 1984

[30] Foreign Application Priority Data

Oct. 25, 1983 [EP] European Pat. Off. ........ 83306458.7

[51] Int. Cl.$^4$ ............................................. G01H 9/00
[52] U.S. Cl. .................................................... 73/655
[58] Field of Search ........................ 73/655, 657, 653; 250/227; 350/96.1, 371

[56] References Cited

U.S. PATENT DOCUMENTS 4,071,753  1/1978  Fulenwider et al. ................. 73/655

FOREIGN PATENT DOCUMENTS 57-120827  7/1982  Japan .
WO79/00841 10/1979  PCT Int'l Appl. .
1277099  6/1972  United Kingdom ................. 73/655

OTHER PUBLICATIONS

C. H. Agren, "Photoelectric Vibration Probe for String Instruments," Electronic Engineering, vol. 46, No. 362, Dec. 1974, pp. 18, 19, London, GB.

*Primary Examiner*—Stephen A. Kreitman
*Attorney, Agent, or Firm*—Ronald L. Drumheller

[57] ABSTRACT

An optical vibration analyzer is disclosed in which a fiber optic probe collects back scattered light from a vibrating surface illuminated with non-coherent light. The probe is positioned very close to the vibrating surface such that the amount of light scattered back into the fiber optic probe varies with the instantaneous relative separation between the probe and vibrating surface. A photo-diode detects the varying average intensity of light received by the probe and generates a light intensity signal which is amplified to a usable level. The back scattered light is very small in comparison with ambient light and other non-correlated noise from which it is extracted. Accordingly, vibrations in the observed surface are excited by a sweep oscillator and the received signal is processed through a tracking filter locked to the sweep oscillator. The filtered output is monitored and varies directly with the vibration amplitude of the surface.

8 Claims, 4 Drawing Figures

OPTICAL VIBRATION ANALYZER

DESCRIPTION

1. Technical Field

This invention relates to improvements in optical vibration detectors and analyzers.

2. Background Art

In any product which contains a high speed rotating part, from the size of an electric generator to a magnetic disk file used in data processing, analysis of vibrations is an important part of the design and development process. In magnetic disk files, the speeds of rotation and the flying height of the read/write heads are such that undesired vibration on the order of a few microns ($\mu$m) can cause malfunction of the product.

In an article entitled, "Mechanical Vibration Measurements Using a Fibre Optic Laser-Doppler Probe" in Optics and Laser Technology at pp. 33–36 (February 1978), R. A. Cookson and P. Bandyopadhyay summarize the development of vibration analysis techniques from the use of strain gauges and double pulsed holographic systems to the laser-Doppler technique. This publication also proposes an extension of the laser-Doppler technique by using a flexible fiber optic probe to enable analysis of remote vibrating parts not directly visible.

A similar scheme is described in Optics Communication, Vol. 23, No. 3 at pp. 407–409 (December 1977) in the article entitled, "Flexible Coherent Optical Probe for Vibration Measurement" by Ueha, Shibata and Tsujiuchi.

The use of a laser-Doppler technique, however, has several disadvantages. The laser itself must be mounted on an optical bench and the machine being investigated must be held rigidly in position in relation to the laser. A laser also is an expensive piece of equipment. The present invention has the advantage that no optical bench or expensive optical devices are required; the vibration probe may be hand-held; and the device under investigation need not be moved or touched.

DISCLOSURE OF THE INVENTION

An optical vibration analyzer is disclosed in which a fiber optic probe collects back scattered light from a vibrating surface illuminated with non-coherent light. The probe is positioned very close to the vibrating surface such that the amount of light scattered back into the fiber optic probe varies with the instantaneous relative separation between the probe and vibrating surface. A photo-diode detects the varying average intensity of light received by the probe and generates a light intensity signal which is amplified to a usable level.

The back scattered light is very small in comparison with ambient light and other non-correlated noise from which it is extracted. Accordingly, vibrations in the observed surface are excited by a sweep oscillator and the received signal is processed through a tracking filter locked to the sweep oscillator. The filtered output is monitored and varies directly with the vibration amplitude of the surface.

DESCRIPTION OF THE PREFERRED EMBODIMENTS

Figure 1:
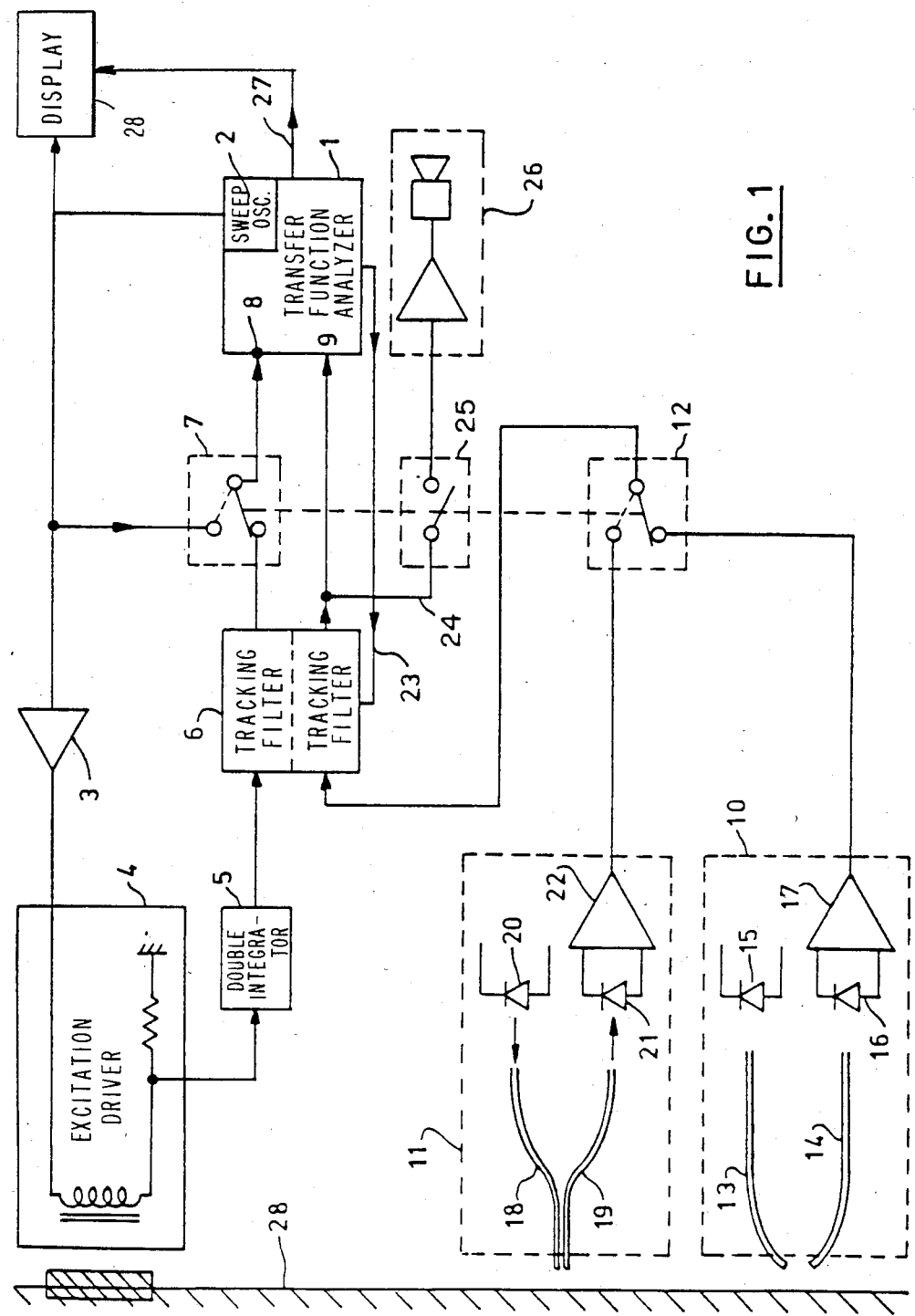
FIG. 1 is a functional block diagram of a preferred embodiment of the invention.

Referring now more particularly to FIG. 1, an optical vibration analyzer is shown having two modes of operation, analyze and search. A main component part of the optical vibration analyzer is a transfer function analyzer 1, which includes a sweep oscillator 2 that is connected through an excitation drive amplifier 3 to an excitation driver 4. A transfer function analyzer is a commercially available test instrument commonly used to form amplitude and/or phase Bode plots. Any general purpose transfer function analyzer (sometimes called a frequency response analyzer) may be used, such as the Model 1250 Analyzer sold by Solartron Ltd. of Basingstoke, Hampshire, England.

The excitation driver 4 is used to induce mechanical oscillations in the machine part to be analyzed for undesirable vibrations. An output line from the excitation driver 4 carries a voltage which is proportional to the acceleration of the mechanical excitation and is fed to a double integration circuit 5 to produce a voltage which theoretically is proportional to the mechanical position of the driven surface about a mean. This position voltage representing the position that the vibrating surface has at the excitation driver position then is fed to one side of a dual tracking filter 6. A tracking filter is a narrow band pass circuit in which the position of the pass band follows or tracks the frequency of a control signal. Thus, a tracking filter passes only the frequency component of the input signal which instantaneously corresponds with the frequency of the control signal. A dual tracking filter functions much like two separate tracking filters, each having its own input and output but each following or tracking the frequency of the same control signal. A dual tracking filter may be purchased, for example, from Spectral Dynamics Corp. of San Diego, Calif. (e.g., Model No. SD1012B). The function of the dual tracking filter is to pass to the filter outputs only the frequency component of the input signals which matches the excitation frequency of sweep oscillator 2. The output of the side of the double tracking filter receiving the drive position signal acts as a reference signal, which in the analyze mode of operation is fed through a switch 7 to an input 8 of the transfer function analyzer 1. In the search mode, switch 7 instead feeds the output of the sweep oscillator 2 to the input 8.

A second input 9 of the transfer function analyzer 1 is derived from one of two optical probes 10 and 11. A switch 12 connects either probe 10 or 11 to the input of the other side of dual tracking filter 6, depending upon the mode of operation. In the analyze mode, probe 10 is connected to filter 6, while in the search mode, probe 11 is connected to filter 6.

Probe 10 is an angled analyzer probe comprising two optical fibers 13 and 14, a gallium arsenide light emitting diode 15, a photosensitive diode 16 and a low-noise amplifier 17.

Probe 11 is a parallel oriented search probe comprising two optical fibers 18 and 19, a gallium arsenide light emitting diode 20, a photosensitive diode 21 and a low-noise amplifier 22.

A frequency control signal (having constant amplitude and a frequency equal to the frequency of sweep oscillator 2) is fed from the transfer function analyzer 1 to the dual tracking filter along line 23. The output of the dual tracking filter derived from the probes is fed in the analyze mode to input 9 of the transfer function analyzer 1 and in the search mode along line 24 through a switch 25 to an audible amplitude monitor 26.

The output of the transfer function analyzer in one mode of operation provides a voltage proportional to the ratio between the input signal amplitudes. In another mode of operation, the transfer function analyzer provides an output voltage proportional to the phase difference between the input signals. These two output signals may be produced on the same output line 27 or on separate output lines (not shown) depending upon the construction of the transfer function analyzer. The output or outputs of the transfer function analyzer are fed to a plotter or similar output display device 28 where a graphical representation is produced of the amplitude ratio of the input signals as a function of drive frequency (commonly known as an amplitude Bode plot) and/or a graphical representation is produced of the phase difference between the input signals as a function of drive frequency (commonly known as a phase Bode plot).

One advantage of the invention stems from the use of non-coherent light for illuminating the vibrating surface, since the use instead of coherent illumination produces detrimental interference effects in the Bode plots.

The analysis mode is used initially to provide one or more transfer function (Bode) plots for the complete mechanical system. An overall transfer function plot reveals the frequencies of resonance in the mechanical system being analyzed. For this mode, probe 10 is mounted at a fixed position. The transfer function analyzer 1 receives two inputs from the dual tracking filter 6 and produces an output representing as a function of drive frequency, the ratio of the drive frequency component of the detected vibration amplitude at the probe 10 position with respect to the drive frequency component of the vibration amplitude at the drive position (an amplitude Bode plot signal) and/or, as a function of drive frequency, the phase difference between the drive frequency component of the detected vibration amplitude at the probe 10 position and the drive frequency component of the vibration amplitude at the drive position (a phase Bode plot signal).

The search mode is then used to positionally locate the source of each fundamental resonance in the system detected during the analysis mode. In order to locate the position of a particular resonance during the search mode, the output frequency of sweep generator 2 is held at that particular resonance frequency while the probe 11 is moved along the vibrating surface 28. An audio output device 26 is connected during the search mode so that the amplitude of the audio output may be used to audibly detect the positional location of the source of the resonance. Probe 11 has parallel oriented fibers so that the detected signal during the search mode is less sensitive to probe orientation and spacing from the surface being searched or scanned for resonances.

Further analysis of a resonance may be done by positioning the analysis probe 10 at the position of resonance located with probe 11 during the search mode and generating a Bode amplitude and/or phase plot at the resonance location using the analysis mode.

Figure 2:
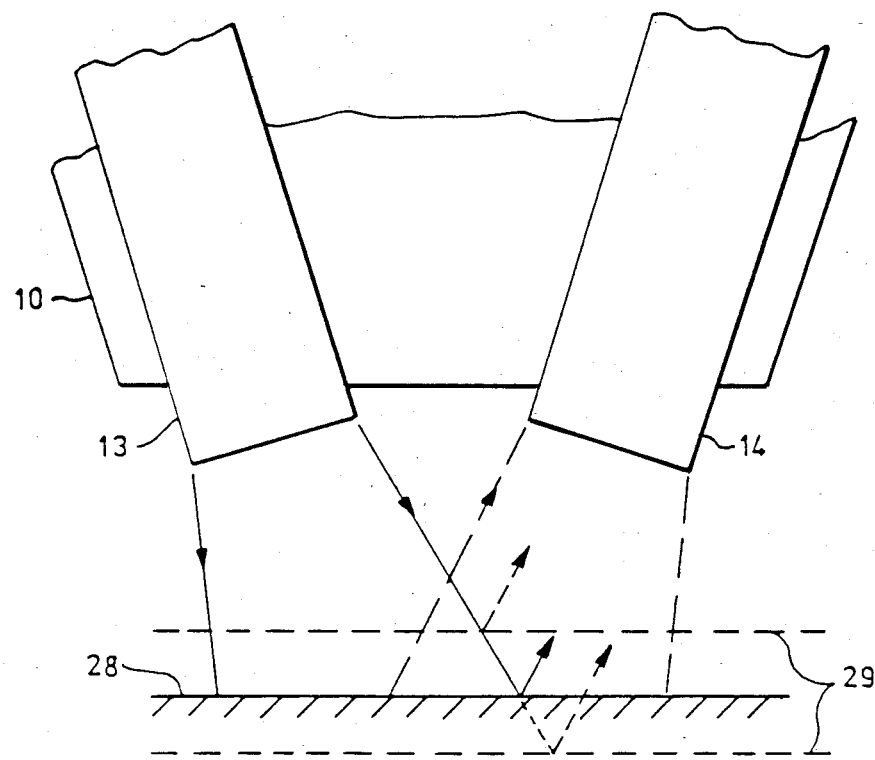
FIGS. 2 and 3 illustrate the operation of the light probes.
Figure 3:
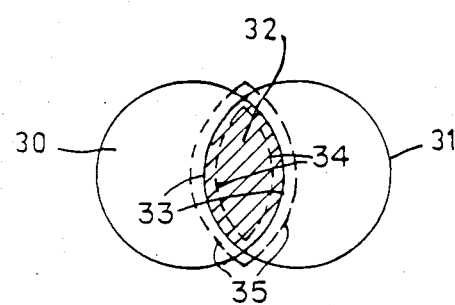

The operation of the light probes is illustrated in FIGS. 2 and 3.

Probe 10 is positioned close to the vibrating surface 28, which vibrates within the limits shown by the lines 29. The source fiber 13 illuminates an area 30 (FIG. 3), while the detection fiber 14 has a field of view 31, thus receiving light only from an area 32, which is the overlap of area 30 and area 31.

As surface 28 approaches the probe, the sizes of areas 30 and 31 get smaller. If the fibers are angled inward as shown in FIG. 2, areas 30 and 31 also simultaneously tend to separate. Both effects tend to make the overlap area 32 decrease in size as the surface 28 approaches the probe. The opposite occurs as surface 28 retreats from the probe, thereby resulting in an increase in the size of the overlap area 32. Three stages of a vibration are illustrated in FIG. 3. The overlap area 32 is smallest when the surface 28 is closest to the probe as defined by the area enclosed by the broken lines 34. The largest area 32 is defined by the area enclosed by the broken lines 85, which occurs when the surface is farthest away. The mean size for area 32 is represented by the shaded area enclosed by solid lines 33.

The amount of light detected by fiber 14 will vary directly with the variation in size of area 32. Detector diode 16 will produce a voltage proportional to the overlap area 32, which is changing directly with the movement of surface 28.

Alternative schemes are possible for generating a position detection signal corresponding to the spacing or separation between a surface and a fiber optic probe. As a two fiber probe moves away from a surface, initially the signal amplitude will increase and then eventually it will decrease again. The above described scheme utilizes the initially increasing region of the response curve. The angled configuration for the fibers provides improved sensitivity and better linearity over the parallel fiber configuration. For this reason the angled configuration is preferred for use in the analysis mode.

The parallel fiber configuration performs better over a wide detection range than does the angled configuration. It also performs better than the angled configuration when the later decreasing portion of the response curve is used for position detection rather than the initially increasing region of the response curve. Since a wide range of operation is advantageous for the search mode and linearity is not required, the parallel configuration is preferably used in the search mode.

The dual tracking filter 6 receives from the double integration circuit 5 a reference drive signal which is theoretically proportional to the position that the vibrating surface 28 has at the excitation driver position and receives a signal from either amplifier 22 or 17 corresponding to the actual position of the vibrating surface at probe 11 or 10 respectively.

The transfer function analyzer 1 then develops an output signal which corresponds to the ratio between the two inputs and/or the phase difference between the two inputs. When displayed on an oscilloscope or a plotter as a function of drive frequency, this output signal becomes a Bode amplitude and/or phase plot.

Figure 4:
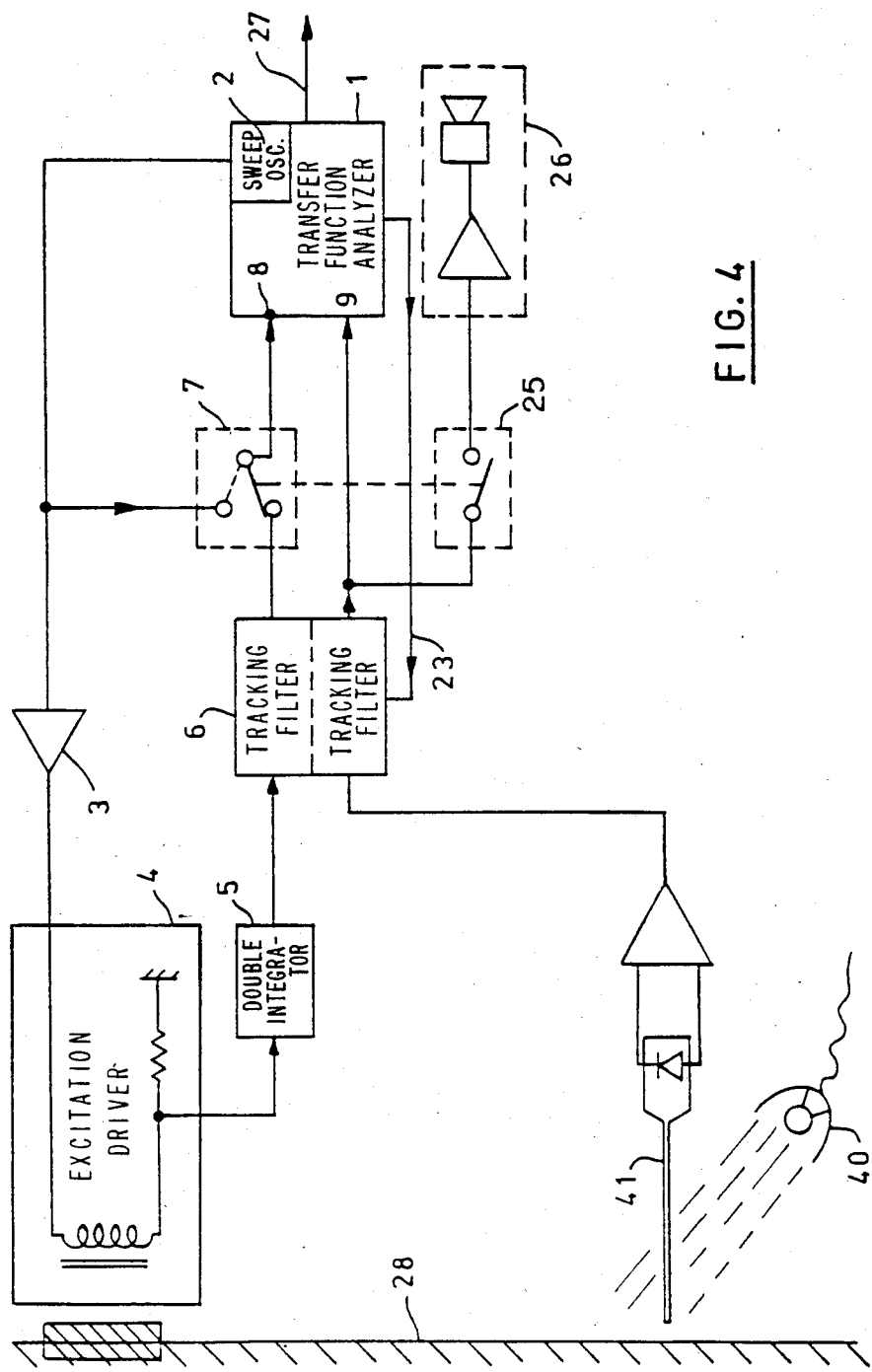
FIG. 4 shows an alternative embodiment of the invention.

An alternative embodiment is shown in FIG. 4 in which a white light source 40 is used to illuminate the vibrating surface 28 and only a single detecting fiber 41 is used. The operation of this embodiment is similar to the FIG. 1 embodiment except that the variation in detected light is due to shadow areas being created by surface discontinuities or by texture differences or by the fiber itself.

The vibrating surface 28 illustrated in the drawings might be flat as shown, but typically instead the vibrating surface comprises various angled elements which provide light and shaded areas which can be used with a single fiber probe to produce a position signal. Since the detection fiber is positioned very close to the vibrating surface, the fiber itself also might create a shadow edge which also can be used with a single fiber probe to produce a position signal.

Having thus described my invention, what I claim as new, and desire to secure by Letters Patent is:

1. An optical analyzer including a fiber optic probe having a predetermined field of view, characterized in that said analyzer further comprises:
   means for illuminating with non-coherent light a limited area of a surface to be analyzed;
   a light intensity detection device for producing a first electrical signal directly related to the intensity of light received by said fiber optic probe;
   sweep oscillator means for providing an excitation signal to the surface to be analyzed;
   means for connecting said first electrical signal and said excitation signal to inputs of a tracking filter which operates to eliminate background interference signals from said first signal; and
   means for feeding the output of said tracking filter to an output monitor device,
   whereby the vibration amplitude of the surface to be monitored is output to an output device.

2. A vibration analyzer as defined in claim 1 wherein said illumination means includes an optical fiber mounted in a predetermined relationship with respect to said optical fiber probe, whereby the relationship of the illuminated area and the field of view of said optic probe may be directly controlled.

3. A vibration analyzer as defined in claim 1 and further comprisising a signal integration circuit responsive to said excitation signal for providing an electrical position signal indicative of the position of the surface to be measured relative to a start position and wherein said tracking filter is a dual tracking filter and the position signal is fed to a third input of said tracking filter, and further comprising means for feeding the first and second output of the tracking filter to first and second inputs of a transfer function analyzer the outputs of which are proportional to the phase and gain of the vibration of the surface.

4. A vibration analyzer as defined in claim 2 wherein said non-coherent light source is a gallium-arsenide diode.

5. A vibration analyzer as defined in claim 4 and further comprising a second fiber optic probe, said first fiber optic probe being mounted in a fixed relationship with respect to the vibrating surface and said second fiber optic probe being connected to a trailing cable, and further comprising means for switching said analyzer so as to receive signals either from said first or said second probe depending upon the desired vibration analysis.

6. An optical vibration analyzer, comprising:
   sweep oscillator means for inducing a frequency sweep of mechanical vibrations in an object to be analyzed;
   means responsive to said vibration inducing means for generating a reference signal corresponding to the induced mechanical vibrations;
   fiber optic probe means for generating a detection signal corresponding to the instantaneous position of a vibrating surface of said object, said vibrating surface being located remotely from the location at which the mechanical vibrations are being induced;
   tracking filter means for removing from said reference signal and from said detection signal frequency components other than the frequency at which vibrations are being induced; and
   transfer function analyzer means responsive to said reference signal and said detection signal for generating an output signal corresponding to the ratio of said reference signal and said detection signal; and
   means for graphically displaying said output signal as a function of the frequency of said sweep oscillator.

7. An optical vibration analyzer as defined in claim 6 wherein said transfer function analyzer means has an alternative mode of operation wherein an alternative output signal is generated corresponding to the phase difference between said reference signal and said detection signal, said graphical display means displaying said alternative output signal as a function of the frequency of said sweep oscillator.

8. An optical vibration analyzer as defined in claim 6 and further comprising an audible monitoring device for receiving said detection signal during an alternative mode of operation in which said oscillator is held at a mechanical resonance frequency of said object and the position of said optical probe is varied in search of the position where there is a maximum audible signal corresponding to mechanical resonance.

* * * * *